3,052,705
1-AMINO-7-IMINO-1,3,5-CYCLOHEPTATRIENES AND CHELATES THEREOF

Wallace Raymond Brasen, Wilmington, and Edward George Howard, Jr., Hockessin, Del., assignors to E. I. du Pont de Nemours and Company, Wilmington, Del., a corporation of Delaware
No Drawing. Filed Apr. 15, 1958, Ser. No. 728,561
18 Claims. (Cl. 260—439)

This invention relates to novel substituted cycloheptatrienes, chelates thereof and to methods of preparing such compounds.

Seven-membered carbocyclic ring compounds have been the subject of numerous investigations. An example of this class of compounds is tropolone, i.e., 2-hydroxy-2,4,6-cycloheptatriene-1-one. A particularly interesting characteristic of this compound is that it exhibits certain aromatic properties although no benzene ring is present. Compounds containing nitrogens in place of both of the oxygens on adjacent nuclear carbons of tropolone have not received much attention.

It is an object of this invention to prepare new cycloheptatrienes having a member of the group consisting of amino, alkylamino and arylamino radicals and a member of the group consisting of imino, alkyl imino and aryl imino radicals, respectively attached to adjacent carbons of the cycloheptatriene ring. A further object is to prepare such compounds which are useful as dyes.

The novel compounds have the general formula

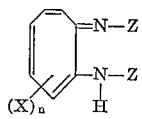

where Z is hydrogen, an alkyl or an aryl radical and X represents a nuclear substituent such as the bromo, chloro, or sulfo radicals and $n$ is a cardinal number of up to 2. Preferred compounds are those wherein Z is aryl.

The new substituted 1,3,5-cycloheptatrienes are obtained by the reaction of ammonia, a primary alkyl monoamine or a primary aryl monoamine with a seven-membered carbocyclic ring compound having one to two nuclear carbon-to-carbon double bonds and two fluorine atoms on each of two adjacent ring carbons, e.g., as represented by the equation

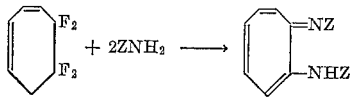

wherein Z has the significance described above.

Cycloheptatrienes of the invention having a nucleophilic substituent such as bromine or chlorine on the cycloheptatriene ring are obtained by use of the corresponding dibromo- or dichloro-substituted tetrafluorocycloheptene.

The new compounds of this invention are readily obtained by reaction in liquid phase of the ammonia or amine reactant with tetrafluorocycloheptadiene or a dibromo- or dichloro-tetrafluorocycloheptene. These compounds have two fluorine atoms on each of two adjacent carbons and have from 1 to 2 nuclear carbon-to-carbon double bonds. The tetrafluorocycloheptadiene is obtained by heating 6,6,7,7-tetrafluorobicyclo(3.2.0)-2-heptene at 600–750° C. under reduced pressure as more completely described in United States Patent No. 2,819,320 by John Jay Drysdale and of common assignment. To illustrate this preparation, which is more specifically disclosed in Example 1 of the aforementioned patent the following example is offered:

The 6,6,7,7-tetrafluorobicyclo(3.2.0)-hept-2-ene used as starting material is prepared, as described in greater detail by Coffman et al. in J. Am. Chem. Soc. 71, 490 (1949), by the addition of tetrafluoroethylene to dicyclopentadiene at temperatures of about 190° C. under autogenous pressure in the presence of a polymerization inhibitor, such as hydroquinone. In addition to the 6,6,7,7-tetrafluorobicyclo(3.2.0)-hept-2-ene, another reaction product of tetrafluoroethylene and cyclopentadiene, 5,5,6,6-tetrafluorobicyclo(2.2.1)-hept-2-ene, is formed as a Diels-Alder adduct of tetrafluoroethylene and cyclopentadiene. The presence of this isomer, however, does not interfere with the pyrolysis of 6,6,7,7-tetrafluorobicyclo(3.2.0)-hept-2-ene to 1,1,2,2-tetrafluorocycloheptadienes, and therefore does not need to be separated from the 6,6,7,7-tetrafluorobicyclo(3.2.0)-hept-2-ene.

In this example the reactor consists of a heat resistant glass tube (the type of glass known commercially as "Vycor") of 13/16 inch inside diameter 20.5 inches long packed with 6 mm. sections of quartz tubing 6 mm. in diameter. The packed zone is 12 inches long. The packed section of the reaction tube is heated externally by means of a cylindrical electric resistance furnace, and the temperature is recorded by a thermocouple placed in the center of the reaction tube. A high capacity vacuum pump maintains the reaction system at the desired reduced pressure. The 6,6,7,7-tetrafluorobicyclo(3.2.0)-hept-2-ene reactant is introduced into the reaction zone gradually by conventional means, e.g., by a dropping funnel, and the reaction products are condensed in a trap which is cooled by a coolant capable of condensing by-products at the pressure employed, e.g., liquid nitrogen.

Two hundred twenty-seven parts of the portion of the reaction mixture of tetrafluoroethylene and dicyclopentadiene boiling at 123–132° C. (obtained by the process of Coffman et al. mentioned previously) and containing a major proportion of 6,6,7,7-tetrafluorobicyclo(3.2.0)-hept-2-ene is added slowly to a reaction tube of the type described in the paragraph above, which is maintained at 700° C.±15° C. at 2 mm. mercury pressure. After the addition is complete, about 120 minutes being required, the cold trap containing the reaction product is removed from the system and the low boiling by-products are allowed to evaporate at room temperature. The residue is then rapidly distilled and there is obtained 203 parts of a liquid reaction product. This reaction product can be fractionated in an efficient fractionating column to yield a mixture containing approximately 50% of the tetrafluorocycloheptadienes or may be used as such without any further separation. With respect to the position of the unsaturation in the tetrafluorocycloheptadiene, there appears to be no difference in yield or reaction product when either the conjugated or nonconjugated unsaturated ring compounds are used.

The reaction of this invention involves the removal of the flourines from the tetrafluorocycloheptadiene and replacement by the nitrogen containing substituents For maximum yields, the ammonia or amine reactant is employed in a ratio of at least two moles per mole of the tetrafluorocycloheptadiene but these proportions are by no means critical. In general, molar ratios of ammonia or amine reactant to tetrafluorocycloheptadiene can vary from 1:1 or less to as high as 1:6 or even more. The reaction takes place in the presence of an acid acceptor such as tertiary amines, alkali metal carboxylates, or even excess reacting base to neutralize hydrogen fluoride.

The time needed for substantially complete reaction depends on the temperature. Generally times of about one half hour to ten hours are employed. The temperature employed for the reaction is not critical and can be room temperature or above, suitably in the range of from about 20–100° C.

To insure liquid phase for the reaction, inert solvents or diluents are generally employed. Those that can be readily removed from the reaction product or employed as a crystallization medium for the products are preferred. Suitable solvents are the lower alkanols (of up to 6 carbons), tertiary amines, ethers, hydrocarbons, etc.

The new compounds are purified by crystallization or removal of solvent. The reaction involves the production of fluoride ion, which should be removed. One means of purification consists in the preparation of the hydrochloride salt of the new compound followed by formation of the free base and crystallization from a suitable solvent.

The arylamine which may be employed, ArNH₂, has one primary amine group in which nitrogen is directly attached to aromatic carbon. Suitable amines are naphthylamine and compounds represented by the formula

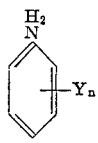

wherein Y is a member of the group consisting of halogen, lower alkyl, lower alkoxy, lower dialkylamino, nitro and sulfonic acid radicals and $n$ is a cardinal number, not greater than 2. Thus it may be an aniline which can be ring substituted with substituents that do not interfere with the reaction or it may be naphthylamine. The amine preferably contains up to 10 carbons. Amines that are particularly useful include aniline, toluidine, naphthylamine, p-ethoxyaniline, 2,4-dichloroaniline, 2,4-dinitroaniline, sulfanilic acid and p-diethylaminoaniline.

Ammonia may be used as the basic reactant and primary alkyl monoamines can also be used. The latter term is intended to include primary cycloalkyl and aralkyl monoamines. The alkyl group can contain up to and including ten carbon atoms and may bear inert substituents. Among such suitable amines are ethylamine, propylamine, n-butylamine, hexylamine, cyclohexylamine, benzylamine, n-octylamine, and n-decylamine.

The preferred products are the 1-arylamino-7-arylimino-1,3,5-cycloheptatrienes. They are superior since when employed as dyes (particularly as a metal chelate) they are more highly colored and more resistant to removal from fabric by heat (i.e., they have superior sublimation fastness). These compounds are represented by the formula

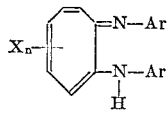

wherein X represents halogen, preferably chlorine, bromine, or sulfonic acid (i.e., the sulfo radical, $SO_3H$) and Ar is selected from the group consisting of phenyl, lower alkylphenyl, halophenyl, lower alkoxyphenyl, nitrophenyl, lower dialkylaminophenyl, sulfophenyl and naphthyl radicals and $n$ is a cardinal number not greater than 2. Specific examples of the new compounds of this invention thus include: 1-(p-methylphenylamino)-7-(p-methylphenylimino)-1,3,5-cycloheptatriene, 1 - (α-naphthylamino)-7-(α-naphthylimino) - 1,3,5 - cycloheptatriene, and others as further described hereinafter.

The following examples in which the parts are by weight further illustrate the preparation of the new compounds of this invention.

EXAMPLE I

*1-(Phenylamino)-7-(Phenylimino)-1,3,5-Cycloheptatriene and Hydrochloride*

A solution of 10.1 parts of triethylamine in 8 parts of methanol was added to a solution of 16.6 parts of a mixture containing approximately 50% of the tetrafluorocycloheptadienes in 40 parts of methanol. The tetrafluorocycloheptadiene mixture was prepared by the method described above. To the resulting solution was added 18.6 parts of aniline in 8 parts of methanol. After the original reaction had subsided, the solution was heated on the steam bath for 1 hour and cooled. The hydrochloride was precipitated by addition of the above solution to a mixture of ice (50 parts) and concentrated hydrochloric acid (50 parts). The yellow solid hydrochloride removed by filtration amounted to 9 parts, M.P. (decomp.) 186° C.

*Analysis.*—Calcd. for $C_{19}H_{17}N_2Cl$: C, 73.89; H, 5.22; N, 9.07. Found: C, 75.38; H, 5.68; N, 9.07.

The infrared spectrum of this hydrochloride confirmed the structure indicated in the example title.

The free base, 1-(phenylamino)-7-(phenylimino)-1,3,5-cycloheptatriene, was isolated by stirring a small portion of the hydrochloride obtained above with a solution of potassium carbonate. The yellow solid thus obtained was removed by filtration and recrystallized from methanol, M.P. 86.5–87° C.

*Analysis.*—Calcd. for $C_{19}H_{16}N_2$: C, 83.80; H, 5.93; N, 10.25; M.W., 272. Found: C, 82.78; H, 5.97; N, 10.05; M.W., 296, 314.

The infrared spectrum of this free base likewise confirmed the structure proposed.

EXAMPLE II

*1-(p-Chlorophenylamino)-7-(p-Chlorophenylimino) 1,3,5-Cycloheptatriene*

A. The above compound was prepared as described in Example I using 1.66 parts of the tetrafluorocycloheptadiene mixture, 3.81 parts of p-chloroaniline, and 5 parts of triethylamine. The red solid which precipitated from the reaction mixture during the period of heating on the steam bath amounted to 1.5 parts, M.P. 166–168° C.

*Analysis.*—Calcd. for $C_{19}H_{14}N_2Cl_2$: C, 66.88; H, 4.10, N, 8.21; M.W. 341. Found: C, 66.31; H, 4.08; N, 8.13; M.W., 365, 374.

B. The subject compound was likewise prepared when potassium acetate was employed in place of triethylamine. Thus after 16.6 parts of tetrafluorocycloheptadiene mixture, 20 parts of anhydrous potassium acetate, 12.8 parts of p-chloroaniline and 80 parts of ethanol were refluxed for two hours, there was obtained upon cooling 2.5 parts of the 1-(p-chlorophenylamino) - 7 - (p-chlorophenylimino)-1,3,5-cycloheptatriene.

EXAMPLE III

*1-(p-Methoxyphenylamino)-7-(p-Methoxyphenylimino) 1,3,5-Cycloheptatriene*

A. The subject compound was prepared as described in Example I using 166 parts of tetrafluorocycloheptadiene mixture, 122 parts p-methoxyaniline, and 200 parts of triethylamine. The red product crystallized during the period of heating on the steam bath and amounted to 50 parts, M.P. 112.5–113° C.

*Analysis.*—Calcd. for $C_{21}H_{20}N_2O_2$: N, 8.43; N.W., 332. Found: N, 8.42; M.W., 346, 361.

B. The subject compound was also obtained in the absence of tertiary amine by using excess primary amine as follows: A solution of 6.6 parts of tetrafluorocycloheptadiene mixture, 7.4 parts of p-methoxyaniline and 16 parts of ethanol was refluxed for 5 hours and cooled in ice. The crystalline solid that separated amounted to 0.5 part and had the same melting point and mixed melting point as the product of part (A) above.

EXAMPLE IV

*1-(p-Dimethylaminophenylamino)-7-(p-Dimethylaminophenylimino)-1,3,5-Cycloheptatriene*

This compound was prepared as described in Example I using 16.6 parts of the tetrafluorocycloheptadiene mixture, 13.6 parts of p-dimethylaminoaniline, and 22 parts of triethylamine. The red solid product precipitated during the period of heating on the steam bath and amounted to 9 parts, M.P. 174.5–176° C.

*Analysis.*—Calcd. for $C_{23}H_{26}N_4$: C, 77.1; H, 7.31. Found: C, 76.99; H, 7.38.

EXAMPLE V

*1-(p-Nitrophenylamino)-7-(p-Nitrophenylimino)-1,3,5-Cycloheptatriene*

This compound was prepared as described in Example I using 16.6 parts of the tetrafluorocycloheptadiene mixture, 13.8 parts of p-nitroaniline, and 22 parts of triethylamine. The orange-red solid which precipitated during the period of heating on the steam bath amounted of 7 parts, M.P.>300° C.

*Analysis.*—Calcd. for $C_{19}H_{14}N_4O_4$: C, 62.98; H, 3.89. Found: C, 62.77; H, 2.79.

EXAMPLE VI

*1-(p-Sulfophenylamino)-7-(p-Sulfophenylimino)-1,3,5-Cycloheptatriene*

The above compound was prepared by the general procedures of Example I except that 3.2 parts of tetrafluorocycloheptadiene mixture, 5 parts sulfanilic acid and 6 parts triethylamine were used. The compound was obtained as the hydrochloride, a yellow solid, soluble in water but insoluble in ethanol. It melted with decomposition at 285° C. The compound dyed nylon a deep yellow when employed as a 3% solution in acetic acid.

EXAMPLE VII

*Sulfonated 1-(p-Chlorophenylamino)-7-(p-Chlorophenylimino)-1,3,5-Cycloheptatriene*

A solution of 6.8 parts of the aminoimine of Example II in 90 parts concentrated sulfuric acid was obtained by warming the mixture at 40–50° C. The resulting red solution was poured into 200 parts of ice with stirring and the gummy, yellow solid was isolated by filtration. The solid was dissolved in 50 parts of hot 10% aqueous ammonia and precipitated from this solution by addition of concentrated hydrochloric acid. The yellow solid crystallized slowly from ethanol to yield long, hairlike needles to give 7.4 parts (90%), M.P. (dec.) 284° C. The ammonium salt was prepared by dissolving the product in hot 20% aqueous ammonia solution and cooling. In the salt form the sulfonated product was more readily recrystallized and dried, M.P. (dec.) 240° C. The purified ammonium salt was analyzed.

*Analysis.*—Calcd. for $C_{19}H_{17}N_3O_3Cl_2S$: N, 9.59. Found: N, 10.06.

EXAMPLE VIII

*Brominated 1-(p-Chlorophenylamino)-7-(p-Chlorophenylimino-1,3,5-Cycloheptatriene*

To a solution of 7.8 parts of the aminoimine of Example II, in 100 parts of methylene chloride, was added a solution of 3.2 parts of bromine in 40 parts of methylene chloride. Very little evolution of heat occurred, and only a slight deepening of the red color of the solution was observed. Addition of 80 parts of ethanol followed by concentration of the solution precipitated 10 parts (90%) of an orange solid. Treatment of a small portion of this product with dilute aqueous ammonia followed by crystallization from ethanol yielded the bromo compound, M.P. 181–182° C.

An alternate method to the same brominated compound involves addition of bromine to tetrafluorocycloheptadiene to give dibromotetrafluorocycloheptene followed by reaction with p-chloroaniline. That the resultant compound was the same was proven by the fact that a mixed melting point of the two products was not depressed. The dibromotetrafluorocycloheptene was prepared as follows:

A solution of 83 parts of 6,6,7,7-tetrafluorocycloheptadiene in 285 parts of methylene chloride was stirred vigorously and irradiated with two sun lamps while a methylene chloride solution containing 120 parts of bromine in 142 parts of solvent was added. The addition was stopped when evolution of hydrogen bromide began, at which time about 80 parts of bromine had been consumed during thirty minutes. Distillation of the product after removal of solvent yielded 118.3 g. (72%) of the dibromide, B.P. 101–105° C./8 mm., $n_D^{25}$, 1.4940.

*Analysis.*—Calcd. for $C_7H_6F_4Br_2$: Br, 48.99. Found: Br, 48.66, 48.71.

The dibromide was then reacted with p-chloroaniline according to the general procedure of Example I to yield 1-(p-chlorophenylamino) - 7 - (p - chlorophenylimino)-1,3,5-cycloheptatriene having a bromine in the heptatriene ring and probably in the 4-position. The product melted at 181–182° C. and had the following analysis:

*Analysis.*—Calcd. for $C_{19}H_{13}N_2Cl_2Br$: N, 6.77. Found: N, 6.88.

The chloro derivative corresponding to the above bromo compound is obtained by the latter method, i.e., reaction of the arylamine with dichlorotetrafluorocycloheptene.

That the compounds are 1-arylamino-7-arylimino-1,3,5-cycloheptatriene and have the structure previously indicated is shown by conversion of the aminoimino compounds to known compounds. When 6.4 parts of 1-(p-chlorophenylamino) - 7 - (p-chlorophenylimino)-1,3,5-cycloheptatriene (see Example II) was dissolved in 100 parts of acetic acid to which was added 20 parts of anhydrous potassium acetate and was refluxed for 6 days, a solid was obtained by dilution with 150 parts of water. Recrystallization of the solid from aqueous alcohol gave two compounds, N-acetyl-p-chloroaniline (identified by comparison with an authentic sample) and 2-(p-chlorophenylamino)tropone (identified by hydrolysis in a hot aqueous alcoholic solution of sodium hydroxide to tropolone and comparison of the latter with an authentic sample).

EXAMPLE IX

*1-Amino-7-Imino-1,3,5-Cycloheptatriene and Hydrofluoride*

A solution containing 33.2 parts of a mixture of fluorocarbons containing 50% of the tetrafluorocycloheptadienes in 40 parts of methanol was combined with an ice cold saturated solution of anhydrous ammonia in 40 parts of methanol. The temperature of this mixture was maintained below 30° C. by cooling in ice until the temperature no longer showed a tendency to rise. The resulting mixture which contained precipitated ammonium fluoride was cooled and diluted with an equal volume of ether and the ammonium fluoride filtered off. Evaporation of the methanol-ether solvents by reduced pressure left a reddish brown oil which was triturated with ether to yield 2.8 parts of the yellow solid hydrofluoride salt of 1-amino-7-imino-1,3,5-cycloheptatriene, M.P. (dec.) 190° C. Infrared analysis of this compound confirmed the proposed structure.

The free base was obtained by neutralizing a water solution of the hydrofluoride with 20% sodium hydroxide to precipitate the yellow hemihydrate of 1-amino-2-imino-1,3,5-cycloheptatriene, M.P. (dec.) 112–113° C. Sublimation produced a sample melting at 113–114° C. with decomposition.

*Analysis.*—Calcd. for $C_7H_8N_2 \cdot \frac{1}{2}H_2O$: C, 65.10; H, 7.02; N, 21.70. Found: C, 65.84; H, 7.55; N, 21.96.

The infrared spectrum of this compound was consistent with the proposed structure.

The structure was also established by hydrolysis of the product with concentrated sodium hydroxide to convert the free base to the sodium salt of tropolone. Acidification of the salt produced tropolone which was identified by mixed melting point with an authentic sample.

Other new aminoimines can be obtained by following the general procedure of Example XII below. Thus using as the amine reactant, the amine of left hand column in Table I below, one obtains the aminoimine of the second column.

TABLE I

| | |
|---|---|
| Ethylamine | 1-ethylamino-7-ethylimino-1,3,5-cycloheptatriene. |
| Propylamine | 1-propylamino-7-propylimino-1,3,5-cycloheptatriene. |
| n-Butylamine | 1-n-butylamino-7-n-butylimino-1,3,5-cycloheptatriene. |
| Hexylamine | 1-hexylamino-7-hexylimino-1,3,5-cycloheptatriene. |
| Cyclohexylamine | 1-cyclohexylamino-7-cyclohexylimino-1,3,5-cycloheptatriene. |
| Benzylamine | 1-benzylamino-7-benzylimino-1,3,5-cycloheptatriene. |
| n-Octylamine | 1-n-octylamino-7-n-octylimino-1,3,5-cycloheptatriene. |
| n-Decylamine | 1-n-decylamino-7-n-decylimino-1,3,5-cycloheptatriene. |

The new compounds of this invention are colored solids, generally exhibiting an orange to red color. They are thus useful as dyes for textiles. When dispersed or dissolved in an appropriate solvent in concentrations of about 0.5–10%, they produce yellow colors in nylon, acetate, polyacrylonitrile and polyester fibers.

EXAMPLE X

The compounds of Examples II and VI were used in a dispersion dyeing process employing 1% of the aminoimine compound based on the weight of the fabric to be dyed. The aminoimine was dissolved in the minimum amount of dimethylformamide necessary to form a solution. The solution was then added to boiling water, which was present in an amount corresponding to about forty times the weight of the dimethylformamide solution. Cloth was added to the hot mixture. Acetate fabric was dyed at the boiling point of the mixture for one hour, and polyethylene terephthalate fabric was dyed at a temperature of 230–250° F. for one hour. The color of the fabrics was yellow.

The new cycloheptatrienes of the invention form chelates. Although they form chelates with aluminum, calcium, titanium, zinc, copper, mercury and palladium, it is preferred that the metal have an atomic number of at least 26 and preferably of atomic number 26–29. Chelate formation is generally effected by combining two molar equivalents of the aminoimines with one molar equivalent of a halide of the metal such as iron, cobalt, nickel, and copper (in the presence of two equivalents of sodium acetate) in a methylene chloride/ethanol solution. After evaporation of the methylene chloride, the chelates were obtained substantially quantitatively as black crystalline solids which were recrystallized from benzene and ethanol.

EXAMPLE XI

*1-Amino-7-Imino-1,3,5-Cycloheptatriene Hydrochloride and Nickel Chelate*

In a reaction similar to Example XI, a solution of 33.2 parts of fluorocarbon (containing 80% of the seven-membered ring fluorodienes) in 40 parts of methyl alcohol was added to a solution of 166 parts of anhydrous ammonia in 160 parts of methyl alcohol during one-half hour. To the ether solution of the oily reaction mixture there was introduced anhydrous hydrogen chloride. Neutralization yielded 14 parts of the crude 1-amino-7-imino-1,3,5-cycloheptatriene, M.P. (dec.) 111–112° C. Sublimation yielded a pure sample of the product which was converted to the bright red nickel chelate by treatment with nickelous chloride and sodium acetate in water.

*Analysis.*—Calcd. for $C_{14}H_{14}N_4Ni$: C, 56.63; H, 4.77; N, 18.87. Found: C, 56.58; H, 4.94; N, 18.12.

EXAMPLE XII

*1-Methylamino-2-Methylimino-1,3,5-Cycloheptatriene*

A solution of 16.6 parts of fluorocarbon (80% tetrafluorocycloheptadiene) in 16 parts of ethyl alcohol was added during one-half hour to an ice-cooled solution of 35 parts of methylamine in 64 parts of ethyl alcohol. The reaction mixture was stirred overnight (12 hours) and poured onto 200 parts of ice with stirring to precipitate the bright yellow 1-methylamino-7-methylimino-1,3,5-cycloheptatriene. Recrystallization from methanol and water yielded 7.3 parts of a pure sample, M.P. 66.5–67° C.

*Analysis.*—Calcd. for $C_9H_{12}N_2$: C, 72.96; H, 8.17; N, 18.91; M.W., 148. Found: C, 73.05; H, 8.26; N, 18.92; M.W., 146, 147.

The nickel chelate of the product (prepared from both the pure aminoimine as well as from the crude reaction mixture, by treatment with nickelous salts) was a red crystalline solid, M.P. 182–184° C.

*Analysis.*—Calcd. for $C_{18}H_{22}N_4Ni$: C, 61.23; H, 6.30; N, 16.67. Found: C, 61.01; H, 6.51; N, 16.19.

EXAMPLE XIII

*Copper Chelate of 1-(p-Chlorophenylamino)-7-(p-Chlorophenylamino)-1,3,5-Cycloheptatriene*

A mixture of 3.4 parts of 1-(p-chlorophenylamino)-7-(p-chlorophenylimino)-1,3,5-cycloheptatriene and 1 part of cupric acetate monohydrate was combined with 13 parts of methylene chloride and 8 parts of ethanol. The mixture was heated until all of the methylene chloride had distilled and was then poured into water. The blue black solid which was isolated amounted to 3.8 parts. M.P. 280–300° C.

*Analysis.*—Calcd. for $C_{38}H_{26}N_4Cl_4Cu$: N, 7.53; M.W., 7.44. Found: N, 7.44; M.W., 792, 757.

The following chelates were prepared by the above described procedure:

Nickel chelate of 1-(p-chlorophenylamino)-7-(p-chlorophenylimino)-1,3,5-cycloheptatriene—
M.P. 245–247° C.

*Analysis.*—Calcd. for $C_{38}H_{26}N_4Cl_4Ni$: N, 7.57; M.W., 739. Found N, 7.56; M.W., 736, 876.

Cobalt chelate of 1-(p-chlorophenylamino)-7-(p-chlorophenylimino)-1,3,5-cycloheptatriene—
M.P. 218–221° C.

*Analysis.*—Calcd. for $C_{38}H_{26}N_4Cl_4Co$: N, 7.56; M.W., 739. Found: N, 7.28; M.W., 809, 985.

Nickel chelate of 1-(p-methoxyphenylamino)-7-(p-methoxyphenylimino)-1,3,5-cycloheptatriene—
M.P. 228–231° C.

*Analysis.*—Calcd. for $C_{42}H_{38}N_4O_4Ni$: N, 7.70; M.W., 721. Found: N, 7.77; M.W., 722, 727.

Nickel chelate of 1-(p-chlorophenylamino)-7-(p-chlorophenylimino)-4-bromo-1,3,5-cycloheptatriene—
M.P. 300° C.

*Analysis.*—Calcd. for $C_{38}H_{24}N_4Cl_4Br_2Ni$: N, 6.25; M.W., 897. Found: N, 6.24; M.W., 970, 920.

The chelates when used as dyes gave deeper colors than the nonchelated compounds. The chelates form red solution in appropriate solvents, and when dispersed or dissolved in concentrations of about 0.5–10%, they give yellow to red colors in cellulose acetate and polyethylene terephthalate fabrics. When the nickel chelate of (p-chlorophenylamino)-7-(p-chlorophenylimino)-1,3,5-cycloheptatriene was used in the manner described in Example X deeper colors were given to the fabrics by the chelate.

Metal chelates of 1-alkylamino-7-alkylimino-1,3,5-cycloheptatrienes are more soluble in organic solvents than the aryl compounds and can be used as dyes for organic solutions such as hydrocarbon fuels.

This application is a continuation-in-part of our co-pending application, Serial No. 704,354, filed December 23, 1957 and now abandoned.

We claim:

1. A compound represented by the formula

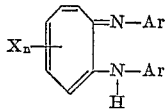

wherein X is selected from the group consisting of chlorine, bromine and sulfo radicals and Ar is selected from the group consisting of phenyl, halophenyl, lower alkylphenyl, lower alkoxyphenyl, nitrophenyl, lower dialkylaminophenyl and sulfophenyl radicals and $n$ is a cardinal number of up to 2.

2. A compound according to the formula of claim 1 wherein X is bromine, $n$ is 1 and Ar is halophenyl.

3. A compound according to the formula of claim 1 wherein $n$ is zero and Ar is lower alkoxyphenyl.

4. Metal chelates of the compound of claim 1.

5. Chelates according to claim 4 wherein the metal has an atomic number of between 26–29.

6. A compound represented by the formula

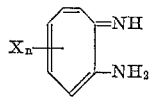

wherein X is selected from the group consisting of chlorine bromine and sulfo radicals and $n$ is a cardinal number not greater than 2.

7. Metal chelates of the compounds of claim 6.

8. A compound represented by the formula

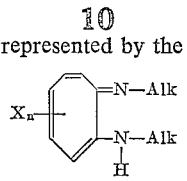

wherein X is selected from the group consisting of chlorine bromine and sulfo radicals and Alk represents 1–10 carbon atom alkyl groups and $n$ is a cardinal number not greater than 2.

9. Metal chelates of the compounds of claim 8.

10. 1 - (phenylamino)-7-(phenylimino)-1,3,5-cycloheptatriene.

11. 1 - (p - chlorophenylamino) - 7 - (p-chlorophenylimino)-1,3,5-cycloheptatriene.

12. 1 - (p-methoxyphenylamino)-7-(p-methoxyphenylimino)-1,3,5-cycloheptatriene.

13. 1 - (p-dimethylaminophenylamino)-7-(p-dimethylaminophenylimino)-1,3,5-cycloheptatriene.

14. 1 - (p-nitrophenylamino)-7-(p-nitrophenylimino)-1,3,5-cycloheptatriene.

15. 1 - (p-sulfophenylamino)-7-(p-sulfophenylimino)-1,3,5-cycloheptatriene.

16. 1-amino-7-imino-1,3,5-cycloheptatriene.

17. Copper chelate of 1-(p-chlorophenylamino)-7-(p-chlorophenylimino)-1,3,5-cycloheptatriene.

18. 1-methylamino - 7 - methylimino-1,3,5-cycloheptatriene.

References Cited in the file of this patent

UNITED STATES PATENTS

| | | |
|---|---|---|
| 2,645,653 | Zerweck et al. | July 14, 1953 |
| 2,729,680 | Anderson | Jan. 3, 1956 |
| 2,813,903 | Freyermuth | Nov. 19, 1957 |
| 2,831,885 | Knoll et al. | Apr. 22, 1958 |